United States Patent
Ishikawa et al.

(10) Patent No.: US 12,511,114 B2
(45) Date of Patent: Dec. 30, 2025

(54) SERVER, STORAGE MEDIUM, AND SOFTWARE UPDATE METHOD

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 18/337,088

(22) Filed: Jun. 19, 2023

(65) Prior Publication Data

US 2024/0069894 A1    Feb. 29, 2024

(30) Foreign Application Priority Data

Aug. 30, 2022  (JP) ................................ 2022-136854

(51) Int. Cl.
    *G06F 8/65*      (2018.01)
    *H04L 41/082*    (2022.01)
(52) U.S. Cl.
    CPC ...................................... *G06F 8/65* (2013.01)
(58) Field of Classification Search
    CPC ....... G06F 8/65; G06F 11/1433; H04L 41/082
    See application file for complete search history.

(56) References Cited

U.S. PATENT DOCUMENTS

| | | | |
|---|---|---|---|
| 2011/0209136 A1* | 8/2011 | Sims ........................ | G06F 8/65 717/171 |
| 2020/0174779 A1* | 6/2020 | David ...................... | G06F 8/654 |
| 2020/0233654 A1* | 7/2020 | Matsumoto ........... | G06F 21/606 |
| 2021/0403016 A1* | 12/2021 | Jung ........................ | G06F 8/65 |
| 2022/0308857 A1* | 9/2022 | Taki ...................... | G07C 5/0808 |

FOREIGN PATENT DOCUMENTS

JP        2017-149323 A       8/2017

* cited by examiner

*Primary Examiner* — Noor Alkhateeb
(74) *Attorney, Agent, or Firm* — Oblon, McClelland, Maier & Neustadt, L.L.P.

(57) ABSTRACT

A server updates software on a control device of a vehicle through wireless communication. The server includes a processor and an interface. The processor performs a process of obtaining user's consent to update the software. The processor instructs to start an update process of first software and second software when the consent to update the first software and the second software is obtained. When an error occurs during the update process of the first software, the processor requests again the consent to update the first software and selectively requests again the consent to update the second software based on predetermined connection between the first software and the second software, before performing again the update process of the first software and the second software.

6 Claims, 7 Drawing Sheets

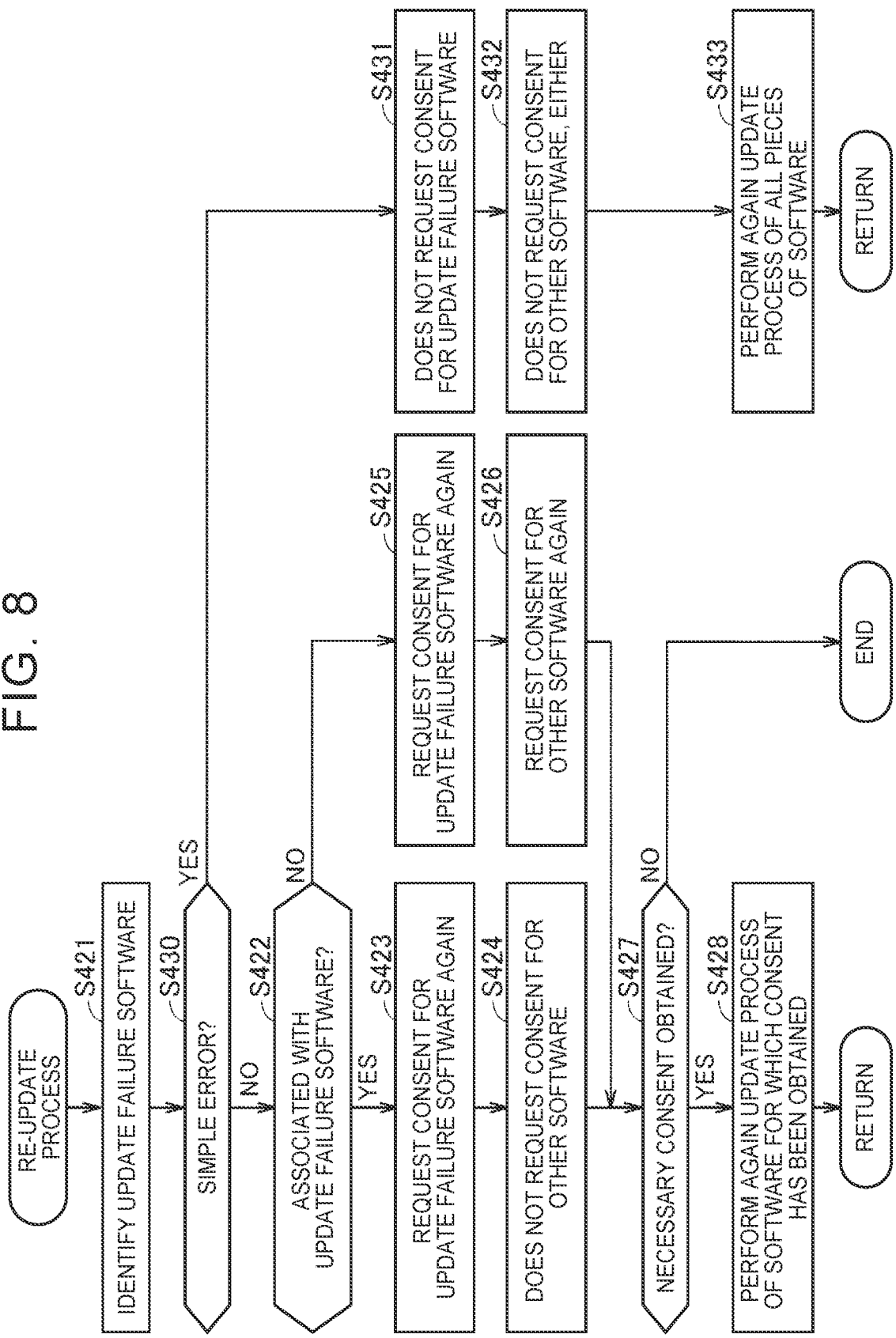

SERVER, STORAGE MEDIUM, AND SOFTWARE UPDATE METHOD

CROSS-REFERENCE TO RELATED APPLICATION

This application claims priority to Japanese Patent Application No. 2022-136854 filed on Aug. 30, 2022, incorporated herein by reference in its entirety.

BACKGROUND

1. Technical Field

The present disclosure relates to servers, storage media, and software update methods.

2. Description of Related Art

Over-the-Air (OTA) technology for updating software (vehicle control programs) stored in a control device (electronic control unit (ECU)) for a vehicle through wireless communication has been studied and developed. For example, Japanese Unexamined Patent Application Publication No. 2017-149323 (JP 2017-149323 A) discloses a vehicle control system capable of safely updating software without impairing user convenience. When it is determined that an electronic key of a vehicle is located inside the vehicle, a mobile device sends a signal requesting a download of update software to a server. An ECU downloads, via the mobile device, the update software sent from the server and updates the software.

SUMMARY

Software updates on electric devices such as personal computers and smartphones typically require user's consent. It is conceivable to obtain user's consent in advance when updating software on an ECU as well. When updating a plurality of pieces of software, user's consent may be obtained for each piece of software.

The inventors focused on the fact that an error may occur during a software update process that is performed after obtaining user's consent. When an error occurs, the question may be whether to request the user's consent again. Requesting the user's consent again every time an error occurs may make the operation of giving consent troublesome for the user. On the other hand, if obtaining user's consent is made completely unnecessary, there is a possibility that the user's intention may not be properly reflected in the software update process.

The present disclosure provides a server that can improve user convenience while properly reflecting a user's intention in updating software.

(1) A server according to one aspect of the present disclosure is configured to update software on a control device of a vehicle through wireless communication. The server includes: one or more processors configured to perform a process of obtaining user's consent to update the software; and an interface configured to output a request for the consent to the vehicle or user equipment. The one or more processors are configured to instruct to start an update process of first software and second software when the consent to update the first software and the second software is obtained. The one or more processors are configured to, when an error occurs during the update process of the first software, request again the consent to update the first software and selectively request again the consent to update the second software based on predetermined connection between the first software and the second software, before performing again the update process of the first software and the second software.

(2) The one or more processors may be configured to perform the update process again without requesting again the consent to update the second software, when the first software and the second software are associated with each other.

(3) The one or more processors may be configured to perform the update process again without requesting again the consent to update the first software and the second software, when the error is a pre-classified simple error.

(4) The one or more processors may be configured to request again the consent to update the second software, when the first software and the second software are not associated with each other.

In the configurations of (1) to (4), when an error occurs during the update process of the first software, whether to request the user's consent again is determined based on the connection between the first software and the second software. Re-consent is requested only once for the pieces of software that are associated with each other. This saves the user the trouble of performing the operation of giving consent, and thus improves user convenience. On the other hand, re-consent is requested for each of the pieces of software that are not associated with each other. Therefore, the user's intention can be properly reflected. According to the configurations of (1) to (4), user convenience can be improved while properly reflecting the user's intention. In the case of the simple error, the user's consent is not required regardless of the connection between the software. This further saves the user the trouble of performing the operation of giving consent, and thus further improves user convenience.

(5) A non-transitory storage medium according to another aspect of the present disclosure stores instructions that are executable by one or more processors. The instructions cause the one or more processors to perform functions in order to update software on a control device of a vehicle through wireless communication. The functions include: outputting a request for user's consent to update the software to the vehicle or user equipment; and instructing to start an update process of first software and second software when the consent to update the first software and the second software is obtained. Outputting the request includes, when an error occurs during the update process of the first software, requesting again the consent to update the first software and selectively requesting again the consent to update the second software based on predetermined connection between the first software and the second software, before performing again the update process of the first software and the second software.

(6) A software update method according to still another aspect of the present disclosure updates software on a control device of a vehicle through wireless communication. The software update method includes: outputting a request for user's consent to update the software to the vehicle or user equipment; and instructing to start an update process of first software and second software when the consent to update the first software and the second software is obtained. Outputting the request includes, when an error occurs during the update process of the first software, requesting again the consent to update the first software and selectively requesting again the consent to update the second software based on predetermined connection between the first software and the second software, before performing again the update process of the first software and the second software.

According to the storage medium of (5) and the method of (6), user convenience can be improved while properly reflecting the user's intention, as with the configuration of (1).

According to the present disclosure, user convenience can be improved while properly reflecting a user's intention in updating software.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 8 is a flowchart showing a second example of the re-update process.

DETAILED DESCRIPTION OF EMBODIMENTS

Hereinafter, an embodiment of the present disclosure will be described in detail with reference to the drawings. The same or corresponding parts are denoted by the same signs throughout the drawings, and description thereof will not be repeated.

EMBODIMENT

System Configuration

Figure 1:
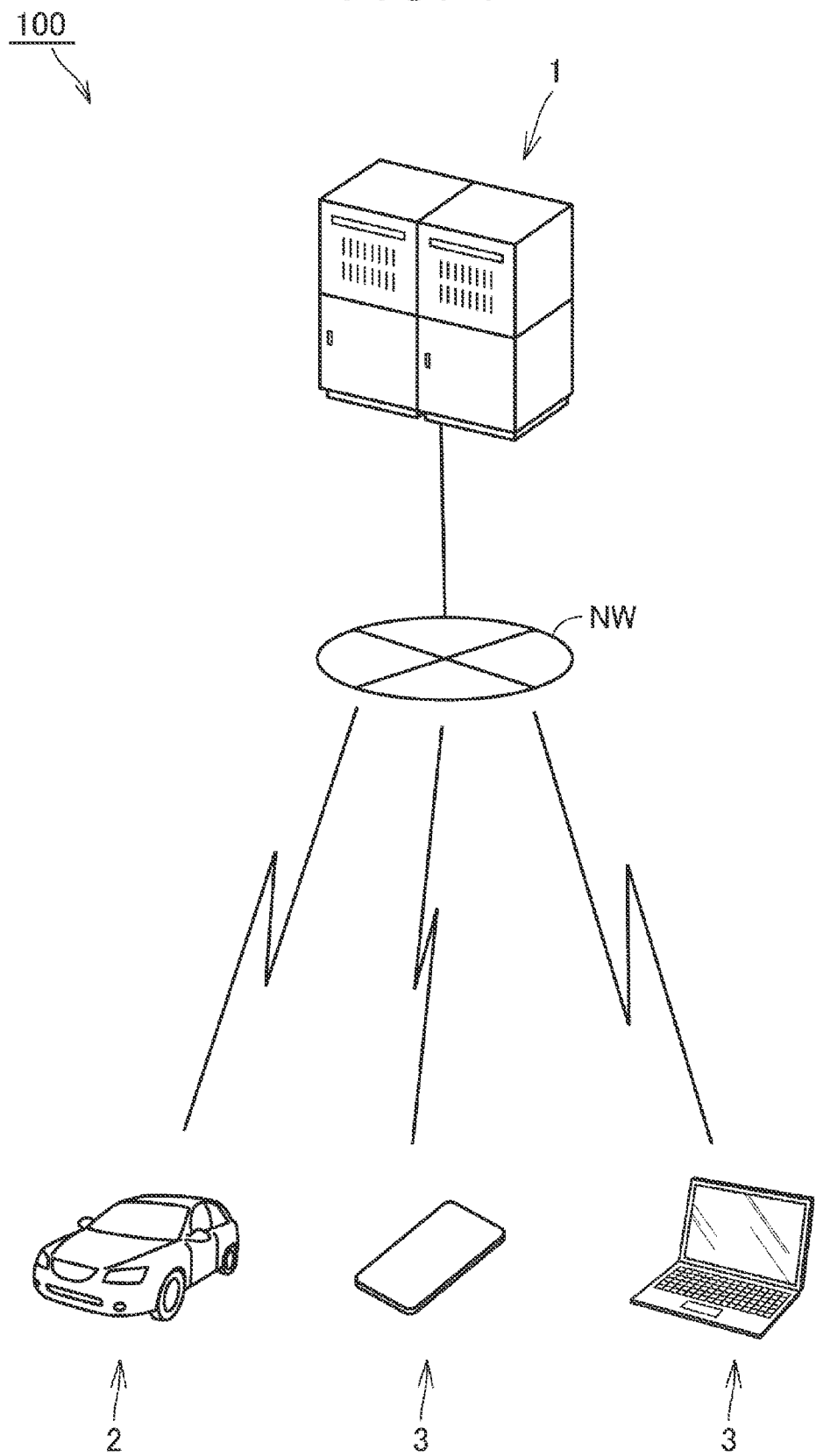
FIG. 1 shows a schematic configuration of an information processing system according to an embodiment of the present disclosure.

FIG. 1 shows a schematic configuration of an information processing system according to an embodiment of the present disclosure. An information processing system 100 includes an OTA center 1, a vehicle 2, and user equipment (UE) 3. The OTA center 1 is connected to the vehicle 2 and the user equipment 3 via a network NW so that the OTA center 1 can communicate with the vehicle 2 and the user equipment 3.

The OTA center 1 is a server that provides software for ECUs (see FIG. 3) mounted on the vehicle 2. The OTA center 1 is managed by, for example, a vehicle manufacturer that manufactures a vehicle platform (VP). The configuration of the OTA center 1 will be described later with reference to FIG. 2.

The vehicle 2 is managed by a user. The user is typically an individual, but may be, for example, a cooperate body that conducts business using the vehicle 2 (a transport operator etc.). The vehicle 2 may be an autonomous vehicle. In this case, the OTA center 1 may be managed by a manufacturer of an autonomous driving system (ADS) (see FIG. 3) mounted on the VP, instead of or in addition to the vehicle manufacturer. The vehicle 2 may be a vehicle that can only be manually driven and that does not support autonomous driving. The configuration of the vehicle 2 will be described later with reference to FIG. 3.

The user equipment 3 is equipment that is operated by the user of the vehicle 2. The user equipment 3 may be mobile equipment or stationary equipment. Examples of the mobile equipment include smartphones, tablets, notebook personal computers (PCs), and wearable devices (smartwatches etc.). Examples of the stationary equipment include desktop PCs. The configuration of the user equipment 3 will be described later with reference to FIG. 4.

Although only one vehicle 2 is shown in FIG. 1 due to space limitations, the information processing system 100 may include any number of vehicles 2. The information processing system 100 typically includes a large number of vehicles 2. The same applies to the user equipment 3.

Figure 2:
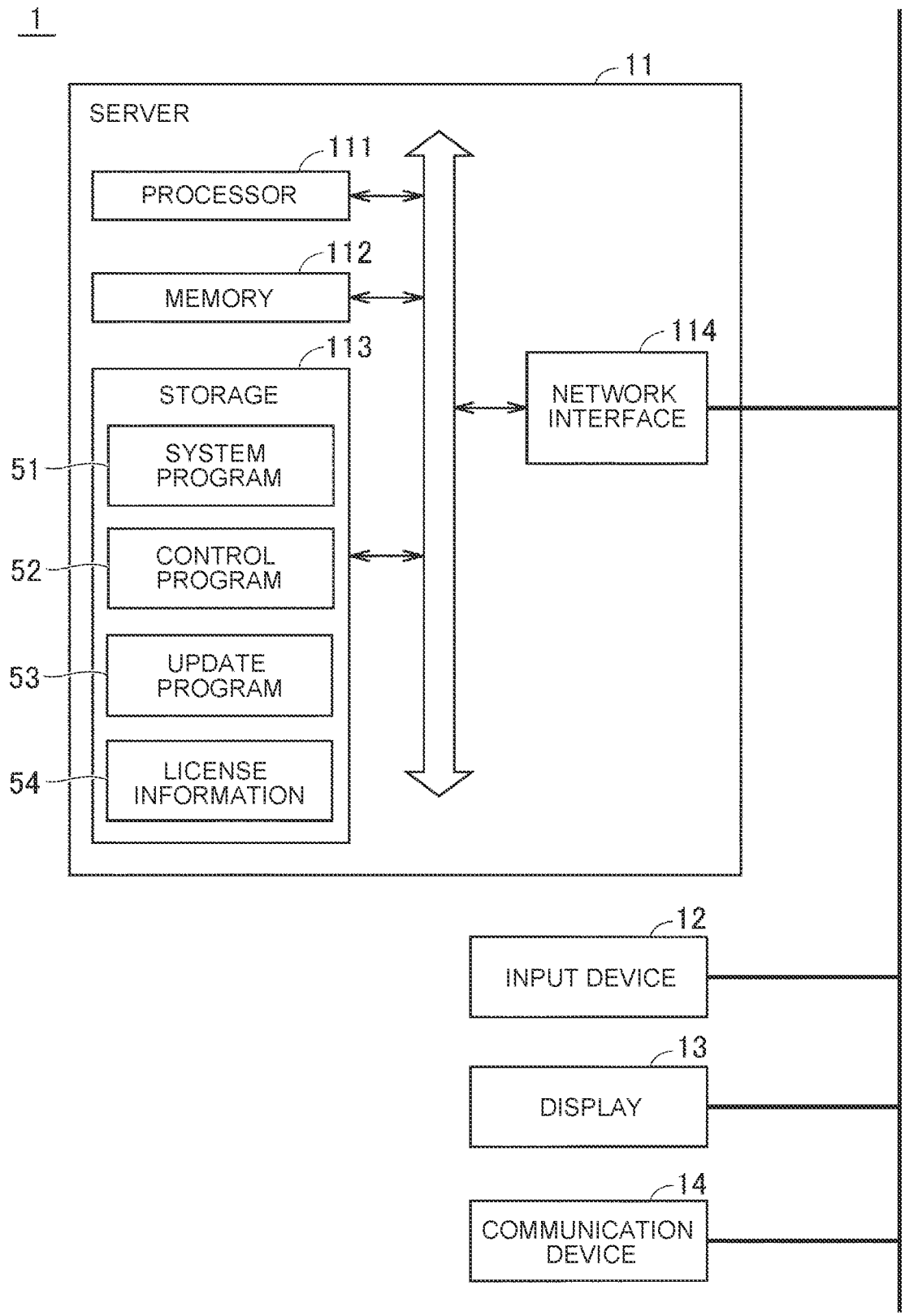
FIG. 2 is a block diagram showing a typical configuration example of an OTA center.

FIG. 2 is a block diagram showing a typical configuration example of the OTA center 1. The OTA center 1 includes a server 11, an input device 12, a display 13, and a communication device 14. The server 11 includes a processor 111, a memory 112, a storage 113, and a network interface 114. The components of the OTA center 1 are connected to each other via a communication bus.

The storage 113 is a rewritable nonvolatile memory such as a hard disk drive (HDD), a solid state drive (SSD), or a flash memory. The storage 113 stores: a system program 51 including an operating system (OS); a control program 52 including computer-readable codes necessary for control calculations; an update program 53 for updating control programs for the vehicle 2; and license information 54 for obtaining user's consent for a download, installation, etc. of the update program 53. The processor 111 is, for example, a central processing unit (CPU) or a micro-processing unit (MPU). The processor 111 reads the system program 51 and the control program 52, loads them into the memory 112, and executes them to implement various processes. The network interface 114 controls data communication that is performed between the server 11 and other devices (vehicle 2, user equipment 3, etc.) via the communication device 14. As will be described in detail later, a request to obtain consent to a software update is also output from the network interface 114 to the vehicle 2 and/or the user equipment 3.

The input device 12 is a keyboard, a mouse, etc. and receives input from an operator of the server 11. The display 13 displays various kinds of information to the operator of the server 11.

Although FIG. 2 shows an example in which the server 11 includes one processor 111, the server 11 may include a plurality of processors. That is, the server 11 includes one or more processors. The same applies to the memory 112 and the storage 113.

As used herein, the "processor" is not limited to a processor in a narrow sense that performs processes in a stored-program mode, and may include hardwired circuits such as application specific integrated circuits (ASICs) and field-programmable gate arrays (FPGAs). Therefore, the term "processor" may be read as processing circuitry whose processes are defined in advance by computer-readable codes and/or hardwired circuits.

Figure 3:
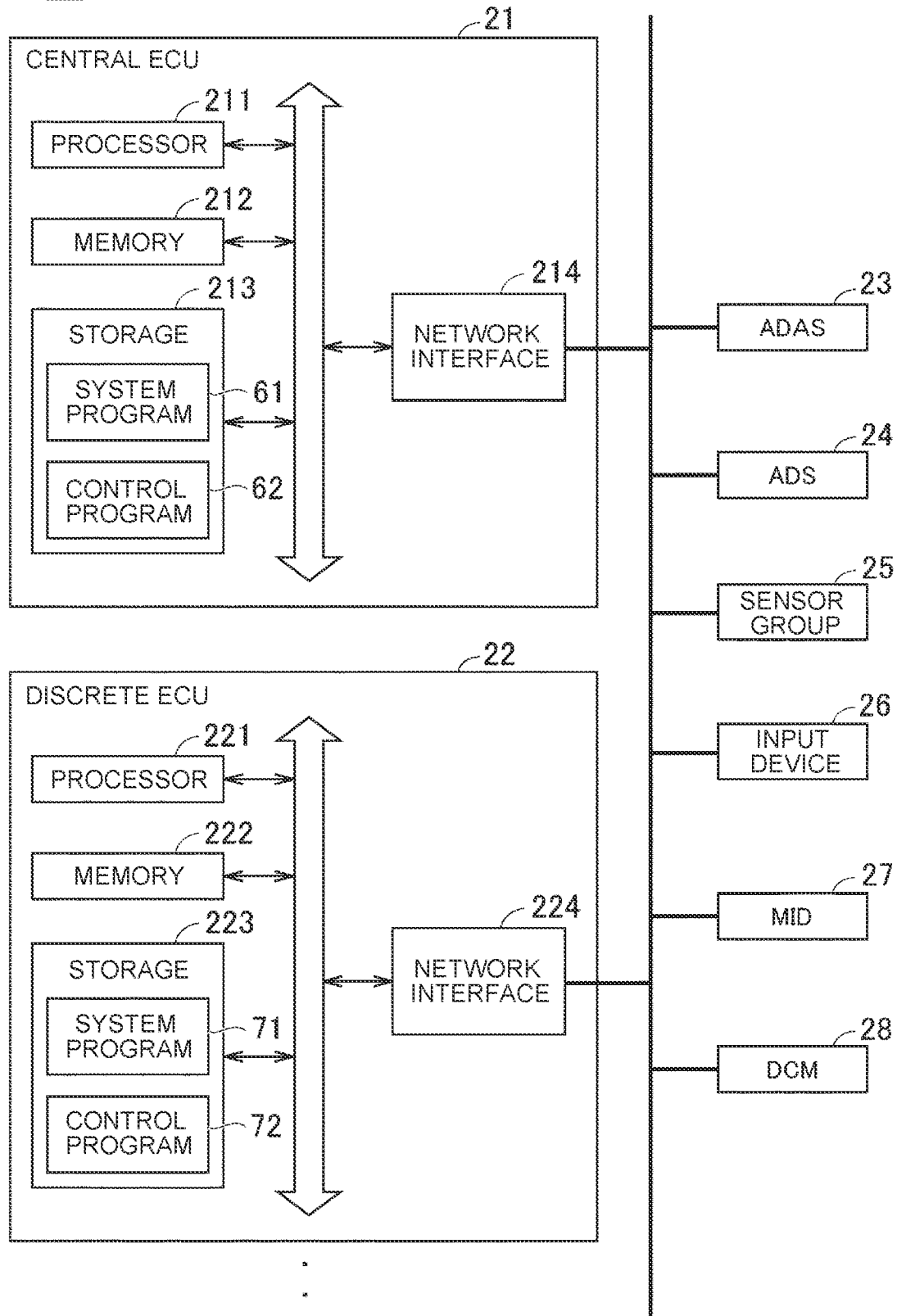
FIG. 3 is a block diagram showing a typical configuration example of a vehicle.

FIG. 3 is a block diagram showing a typical configuration example of the vehicle 2. The vehicle 2 includes a central ECU 21, a plurality of discrete ECUs 22, advanced driver-assistance systems (ADAS) 23, an ADS 24, a sensor group 25, an input device 26, a Multi-Information Display (MID) 27, and a Data Communication Module (DCM) 28. The discrete ECUs 22 are separate ECUs for each feature, and include, for example, a brake ECU, a steering ECU, a motor generator ECU, and a body ECU. The discrete ECUs 22 may be controllers storing software for implementing features of the ADAS 23 and/or the ADS 24. The components of the vehicle 2 are connected to each other via a wired in-vehicle network such as a controller area network (CAN) or in-vehicle Ethernet (registered trademark).

The basic configurations of the central ECU 21 and the discrete ECUs 22 are similar to the configuration of the server 11. A storage 223 of each discrete ECU 22 stores software (system program 71 and control program 72) that is executed by a processor 221 of the discrete ECU 22. Each discrete ECU 22 controls a system corresponding to the discrete ECU 22 so that the vehicle 2 goes into a desired state according to signals from the sensor group 25 etc. As used herein, the system may include a braking system, a steering system, a powertrain system, a body system, etc., none of which are shown.

A processor 211 of the central ECU 21 controls an update process of software stored in the storages 223 of the discrete ECUs 22. The central ECU 21 receives (downloads) software from the OTA center 1 via the DCM 28, and stores (installs) the downloaded software in the storage 223 of the discrete ECU 22 at an appropriate timing. The central ECU 21 then activates the installed software at an appropriate timing.

The ADAS 23 includes, for example, Adaptive Cruise Control (ACC), Auto Speed Limiter (ASL), Lane Keeping Assist (LKA), Pre-Crash Safety (PCS), and Lane Departure Alert (LDA). The ADS 24 is configured to perform autonomous driving of the vehicle 2.

The sensor group 25 includes sensors configured to detect the surroundings of the vehicle 2. The sensor group 25 further includes sensors configured to detect information according to the driving state of the vehicle 2 and detect a steering operation, an accelerator operation, and a brake operation (none of such sensors are shown). Specifically, the sensor group 25 may include, for example, a camera, a radar, a Laser Imaging Detection and Ranging (LIDAR), a vehicle speed sensor, an acceleration sensor, a yaw rate sensor, and a steering sensor (none of which are shown).

The input device 26 is, for example, a touch panel provided on the MID 27. The input device 26 may be a physical switch or button. The MID 27 is a touch panel display on which, for example, map information, vehicle management information, etc. are displayed. An instrument panel, not shown, is also used as a human-machine interface (HMI). The DCM 28 is an in-vehicle communication module. The DCM 28 is configured to allow two-way data communication between the central ECU 21 and the server 11.

Figure 4:
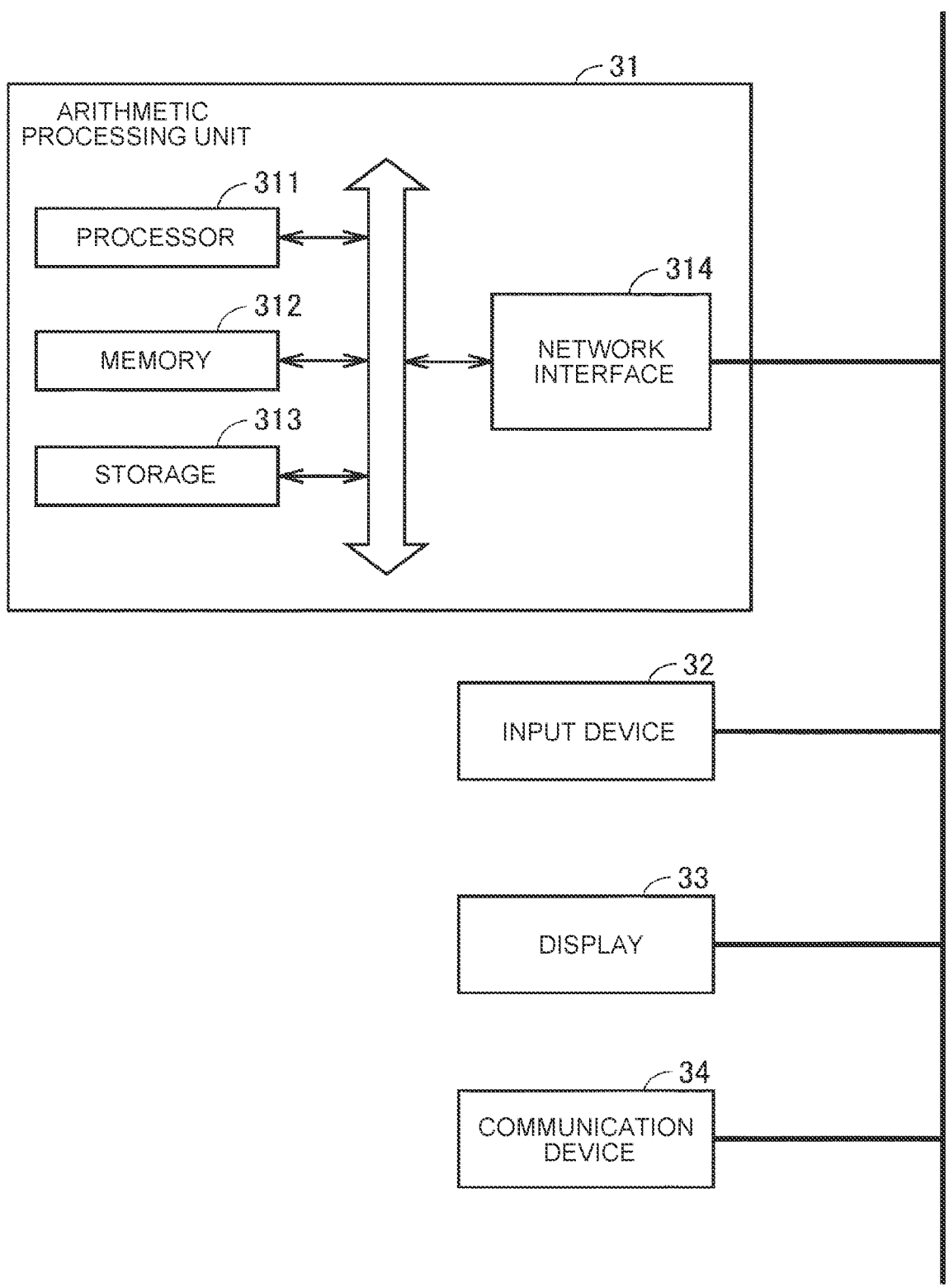
FIG. 4 is a block diagram showing a typical configuration example of user equipment.

FIG. 4 is a block diagram showing a typical configuration example of the user equipment 3. The user equipment 3 includes an arithmetic processing unit 31, an input device 32, a display 33, and a communication device 34. The input device 32 and the display 33 are configured as an integrated unit such as a touch panel display. However, the input device 32 may be a dedicated input device (keyboard, mouse, etc.), and the display 33 may be a stationary monitor. Other configurations of the user equipment 3 are similar to those of the server 11 (see FIG. 2).

User Consent

When updating software on any of the discrete ECUs 22, the OTA center 1 requests the user to consent to the update before performing an update process of the software. When updating two or more pieces of software, the user may be requested to give consent for each piece of software. When the user who has received the request operates the MID 27 or the user equipment 3 to consent to the update, the OTA center 1 performs an update process of the software for which the OTA center 1 obtained the consent from the user.

An error may occur during the update process of the software. When an error occurs, the question may be whether to request the user's consent again. In particular, when many consents are requested to the user in order to update many pieces of software, it may be troublesome for the user to perform the operation of giving consent many times. On the other hand, if obtaining user's consent is made completely unnecessary, there is a possibility that the user's intention may not be properly reflected.

Therefore, when an error occurs during the update process of a plurality of pieces of software, the OTA center 1 determines whether to request the user's consent again based on the connection between or among the pieces of software. In the present embodiment, those pieces of software that are related to each other are associated with each other in advance. The association between or among software will be described below.

Association Between or Among Software

Figure 5:
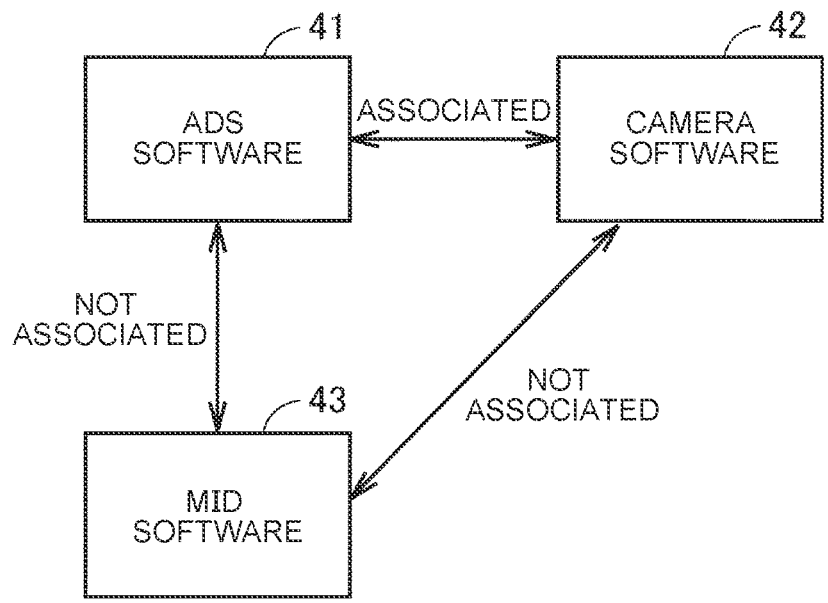
FIG. 5 illustrates association between software.

FIG. 5 is a conceptual diagram illustrating association between software. A situation in which software on three discrete ECUs 22 is updated will be described as an example. As shown in FIG. 5, the three pieces of software are ADS software 41 for controlling the ADS 24, camera software 42 for controlling the camera (not shown) included in the sensor group 25, and MID software 43 for controlling the MID 27.

The surroundings of the vehicle 2 captured by the camera are used for the autonomous driving that is performed by the ADS 24. In this example, it is assumed that the update content of the camera software 42 is related to the autonomous driving that is performed by the ADS 24. Therefore, the ADS software 41 and the camera software 42 are associated with each other. On the other hand, the update content of the ADS software 41 is not directly related to the update content of the MID software 43. Therefore, the ADS software 41 and the MID software 43 are not associated with each other. Similarly, the camera software 42 and the MID software 43 are not associated with each other.

Each piece of software is assigned an identification number (product number such as a product ID). Two or more pieces of software may be associated with each other using the identification numbers. For example, the following two methods may be used.

As a first method, an administrator of the OTA center 1 (that may be a software development company etc.) may register information in advance in each of a plurality of pieces of software to be updated so that each of the pieces of software has an identification number of any other software associated therewith. In the example of FIG. 5, each of the ADS software 41 and the camera software 42 is assigned an identification number. The ADS software 41 also has the identification number of the camera software 42. The camera software 42 also has the identification number of the ADS software 41. The OTA center 1 can determine that the ADS software 41 and the camera software 42 are associated with each other by reading that they have each other's identification numbers.

As a second method, the administrator of the OTA center 1 may generate in advance assembly information indicating that a plurality of pieces of software to be updated belong to the same set (group). In this example, the assembly information includes the identification number of the ADS software 41 and the identification number of the camera software 42. The OTA center 1 can determine that the ADS software 41 and the camera software 42 are associated with each other by referring to the assembly information.

Process Flow

Figure 6:
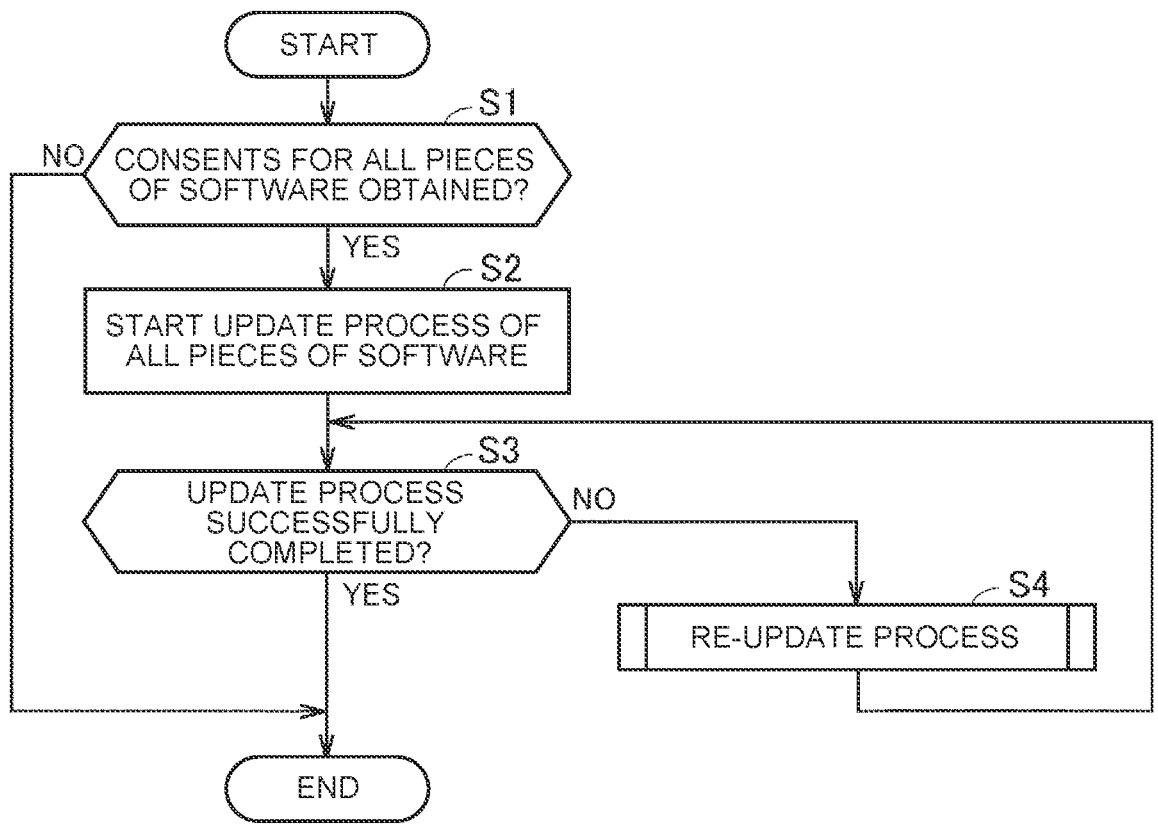
FIG. 6 is a flowchart showing the overall processing procedure for updating software.

FIG. 6 is a flowchart showing the overall processing procedure for updating software. The steps in this flowchart are performed when a predetermined condition is satisfied (e.g., in predetermined cycles). Each step is implemented by software processing by the OTA center 1 (processor 111 of server 11), but may be implemented by hardware (electrical circuitry) disposed in the OTA center 1. Hereinafter, the term "step" is abbreviated as "S." It is herein assumed that a plurality of consents is requested to the user to update a plurality of pieces of software.

In 51, the OTA center 1 determines whether consents to update all the pieces of software have been obtained from the user. When the consents to update all the pieces of software have been obtained from the user (YES in S1), the OTA center 1 starts an update process of all the pieces of software (S2). When the update process of all the pieces of software is successfully completed (YES in S3), the OTA center 1 ends the series of steps. On the other hand, when an error occurs during the update process of at least part of the pieces of software (NO in S3), the OTA center 1 performs a re-update process (S4).

First Example

Figure 7:
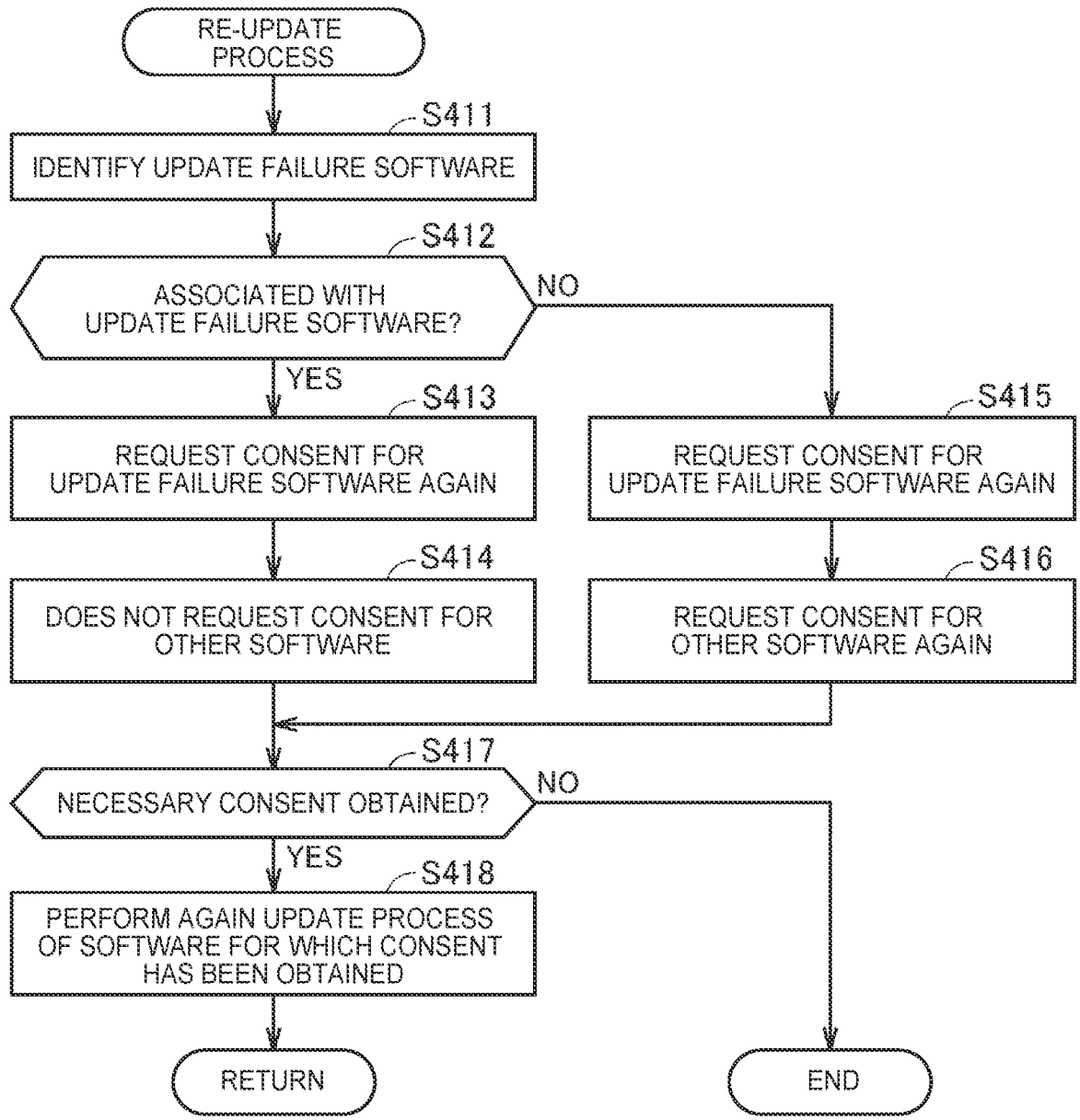
FIG. 7 is a flowchart showing a first example of a re-update process.

FIG. 7 is a flowchart showing a first example of the re-update process (step S4 in FIG. 6). In S411, the OTA center 1 identifies the software for which an error has occurred during the update process (hereinafter referred to as "update failure software").

In S412, the OTA center 1 determines, for each of the plurality of pieces of software to be updated (except the update failure software), whether that software (hereinafter referred to as "other software") is associated with the update failure software. Since the method for associating pieces of software with each other is described above with reference to FIG. 5, description thereof will not be repeated. The update failure software corresponds to the "first software" according to the present disclosure. Other software corresponds to the "second software" according to the present disclosure.

When that other software is associated with the update failure software (YES in S412), the process proceeds to S413, and the OTA center 1 requests the user again to consent to update the update failure software (e.g., the ADS software 41 in the example of FIG. 5). The OTA center 1 does not request the user to consent to update that other software (e.g., the camera software 42) (S414). The order of steps S413, S414 can be reversed.

On the other hand, when that other software is not associated with the update failure software (NO in S412), the process proceeds to S415, and the OTA center 1 requests the user again to consent to update the update failure software (e.g., the ADS software 41). The OTA center 1 also requests the user again to consent to update that other software (e.g., the MID software 43) (S416). The order of steps S415, S416 can also be reversed.

In S417, the OTA center 1 determines whether the necessary consent has been obtained again from the user. When the necessary consent has been obtained again (YES in S417), the OTA center 1 performs again the update process of the software for which the consent has been obtained (S418). The process then returns to S3 in FIG. 6. On the other hand, when the necessary consent could not be obtained this time (NO in S417), the OTA center 1 ends the process without performing the update process again.

As described above, in the present embodiment, when an error occurs during a software update process, re-consent is selectively requested to the user based on the connection between or among the software. Re-consent is requested only once for the pieces of software that are associated with each other. This saves the user the trouble of performing the operation of giving consent, and thus improves user convenience. On the other hand, re-consent is requested for each of the pieces of software that are not associated with each other. Therefore, the user's intention can be properly reflected. According to the present disclosure, user convenience can be improved while properly reflecting the user's intention.

Second Example

FIG. 8 is a flowchart showing a second example of the re-update process. This flowchart is different from the flowchart of the first example (see FIG. 7) in that it further includes steps S430 to S433. Since the other steps S421 to S428 are the same as the steps S411 to S418 in the first example, detailed description thereof will not be repeated.

After identifying the update failure software, the OTA center 1 determines whether the error that has occurred is a simple error. Simple errors may include, for example, an error caused by unstable communication connection and an error caused by interrupted software transfer inside the vehicle 2 (e.g., between the ECUs) due to a power failure etc. Simple errors are distinguished from fatal errors (such as an error that requires a system restart of the vehicle 2). When the error that has occurred is not a simple error (NO in S430), the process proceeds to S422. S422 and the subsequent steps are the same as those described with reference to FIG. 7.

On the other hand, when the error that has occurred is a simple error (YES in S430), the process proceeds to S431. In S431, the OTA center 1 does not request the user's re-consent to update the update failure software. The OTA center 1 does not request the user's re-consent to update that other software, either, regardless of whether that other software is associated with the update failure software (S432). The OTA center 1 then performs again the update process of all the pieces of software (S433). The process then returns to S3 in FIG. 6.

As described above, when an error that has occurred is merely a simple error, the user's re-consent is not required regardless of the connection between or among software. This further saves the user the trouble of performing the operation of giving consent, and thus further improves user convenience.

The embodiment disclosed herein should be construed as illustrative in all respects and not restrictive. The scope of the present disclosure is shown by the claims rather than by the above description of the embodiment and is intended to include all modifications within the scope equivalent to the claims.

What is claimed is:

1. A server configured to update software on a control device of a vehicle through wireless communication, the server comprising:
one or more processors configured to perform a process of obtaining user's consent to update the software; and
an interface configured to output a request for the consent to the vehicle or user equipment, wherein the one or more processors are configured to
start an update process of first software and second software when the consent to update the first software and the second software is obtained, and
when an error occurs during the update process of the first software, before performing again the update process of the first software and the second software, request again the consent to update the first software and the second software when the first software and the second software are not directly related to each other so as to be not associated with each other, and only request again the consent to update the first software when the first software and the second software are directly related to each other so as to be associated with each other.

2. The server according to claim 1, wherein the first software includes software performing autonomous driving of the vehicle, and the second software includes software controlling a sensor of the vehicle.

3. The server according to claim 1, wherein the first software includes software performing autonomous driving of the vehicle, and the second software includes software controlling an information display of the vehicle.

4. The server according to claim 1, wherein the first software includes software controlling a sensor of the vehicle, and the second software includes software controlling an information display of the vehicle.

5. A non-transitory storage medium storing instructions that are executable by one or more processors and that cause the one or more processors to perform functions in order to update software on a control device of a vehicle through wireless communication, the functions comprising:
outputting a request for user's consent to update the software to the vehicle or user equipment; and
starting an update process of first software and second software when the consent to update the first software and the second software is obtained, wherein outputting the request includes, when an error occurs during the update process of the first software, before performing again the update process of the first software and the second software,
requesting again the consent to update the first software and the second software when the first software and the second software are not directly related to each other so as to be not associated with each other, and
only requesting again the consent to update the first software when the first software and the second software are directly related to each other so as to be associated with each other.

6. A software update method for updating software on a control device of a vehicle through wireless communication, the software update method comprising:
outputting a request for user's consent to update the software to the vehicle or user equipment; and
starting an update process of first software and second software when the consent to update the first software and the second software is obtained,
wherein outputting the request includes, when an error occurs during the update process of the first software, before performing again the update process of the first software and the second software,
requesting again the consent to update the first software and the second software when the first software and the second software are not directly related to each other so as to not be associated with each other, and
only requesting again the consent to update the first software when the first software and the second software are directly related to each other so as to be associated with each other.

\* \* \* \* \*